US00RE40530E

(19) United States
(12) Reissued Patent
Collins et al.

(10) Patent Number: US RE40,530 E
(45) Date of Reissued Patent: Oct. 7, 2008

(54) PUBLIC KEY CRYPTOGRAPHIC APPARATUS AND METHOD

(75) Inventors: Thomas Collins, Saratoga, CA (US); Dale Hopkins, Gilroy, CA (US); Susan Langford, Sunnyvale, CA (US); Michael Sabin, Sunnyvale, CA (US)

(73) Assignee: Hewlett-Packard Development Company, L.P., Houston, TX (US)

(21) Appl. No.: 09/694,416

(22) Filed: Oct. 20, 2000

Related U.S. Patent Documents

Reissue of:
(64) Patent No.: 5,848,159
Issued: Dec. 8, 1998
Appl. No.: 08/784,453
Filed: Jan. 16, 1997

U.S. Applications:
(60) Provisional application No. 60/033,271, filed on Dec. 9, 1996.

(51) Int. Cl.
*H04L 9/30* (2006.01)
*H04L 9/00* (2006.01)

(52) U.S. Cl. ..... 380/30; 380/29
(58) Field of Classification Search ..... 380/28, 380/30
See application file for complete search history.

(56) References Cited

U.S. PATENT DOCUMENTS

| | | | | |
|---|---|---|---|---|
| 4,200,770 A | * | 4/1980 | Hellman et al. | |
| 4,218,582 A | * | 8/1980 | Hellman et al. | |
| 4,351,982 A | | 9/1982 | Miller et al. | 178/22.1 |
| 4,405,829 A | * | 9/1983 | Rivest et al. | 380/28 |
| 4,424,414 A | * | 1/1984 | Hellman et al. | |
| 4,514,592 A | | 4/1985 | Miyaguchi | 178/22.11 |
| 4,995,082 A | * | 2/1991 | Schnorr | 380/23 |
| 5,046,094 A | | 9/1991 | Kawamura | 380/46 |
| 5,136,647 A | | 8/1992 | Haber et al. | 380/49 |
| 5,321,752 A | * | 6/1994 | Iwamura et al. | 380/28 X |
| 5,343,527 A | | 8/1994 | Moore | 380/4 |
| 5,351,298 A | | 9/1994 | Smith | |
| 5,761,310 A | | 6/1998 | Naciri | 380/30 |
| 5,835,598 A | * | 11/1998 | Schwenk | 380/30 |
| 5,974,151 A | * | 10/1999 | Slavin | 380/30 |

OTHER PUBLICATIONS

Rivest, et. al. A Method for Obtaining Digital Signatures and Public–Key Cryptosystems, kACM 1979.*
Knuth, The Art of Computer Programming vol. 2, 1969.*
Itakura and Nakamura, A Public–Key Cryptosystem Suitable for Digital Multisignatures, NEC Res. & Develop. No. 71 Oct. 1983.*
S. A. Vanstone and R. J. Zuccherato, Using four–prime RSA in which some of the bits are specified.*
Rivest, Shamir, and Aldeman, A Method for Obtaining Digital Signatures and Public Key Cryptosystems, Communications of th ACM, 21(2), Feb. 1978.*

(Continued)

*Primary Examiner*—Matthew B Smithers

(57) ABSTRACT

A method and apparatus are disclosed for improving public key encryption and decryption schemes that employ a composite number formed from three or more distinct primes. The encryption or decryption tasks may be broken down into sub-tasks to obtain encrypted or decrypted sub-parts that are then combined using a form of the Chinese Remainder Theorem to obtain the encrypted or decrypted value. A parallel encryption/decryption architecture is disclosed to take advantage of the inventive method.

REEXAMINATION RESULTS

The questions raised in reexamination request No. 90/005,733, filed May 18, 2000 and reexamination request No. 90/005,776, filed on Jul. 28, 2000, have been considered and the results thereof are reflected in this reissue patent which constitutes the reexamination certificate required by 35 U.S.C. 307 as provided in 37 CFR 1.570(*e*).

53 Claims, 2 Drawing Sheets

OTHER PUBLICATIONS

Captain Nemo, RSA Moduli Should Have 3 Prime factors, Aug. 1996.*
Donald Knuth, The Art of Computer Programming, vol. 2, Addison–Wesley Publishing Company 1969.*
S.A. Vanstone et al., "Using Four–Prime RSA in Which Some of the Bits are Specified," Dec. 8, 1994, Electronics Letter, vol. 30, No. 25. pp. 2118–2119.
C. Couvruer et al., "An Introduction to Fast Generation of Large Prime Numbers," 1982, Philips Journal of Research, vol. 37, Nos. 5–6, pp. 231–264.
Y. Desmedt et al., "Public–Key Systems Based on the Difficulty of Tampering (Is There a Difference Between DES and RSA?)," 1986, Lecture Notes in Computer Science, Advances in Cryptology—Crypto '86 Proceedings.
J. J. Quisquater et al., "Fast Decipherment Algorithm for RSA Public–Key Cryptosystem" Oct. 1982, Electronic Letters, vol. 19, No. 21.
Cetin Kaya Koc, "High–Speed RSA Implementation (Version 2.0)," Nov. 1994, RSA White Paper, RSA Laboratories.
Rivest et al., "A Method for Obtaining Digital Signatures and Public–Key Cryptosystems," Feb. 1978, Communications of the ACM, vol. 21.
PKCS #1: RSA Encryption Standard (Version 1.5), Nov. 1993, RSA Laboratories Technical Note.
M.O. Rabin, "Digitalized Signatures and Public–Key Functions as Intractable as Factorization," Jan. 1979, MIT Laboratory for Computer Science.
R. Lidl et al., "Permutation Polynomials in RSA–Cryptosystems," 1984, Advances in Cryptology—Crypto '83, pp. 293–301.
D. Boneh et al., "Generating a Product of Three Primes with an Unknown Factorization," Computer Science Department, Stanford University, date unknown.
J. J. Quisquater et al., "Fast Generation of Large Prime Numbers" Jun. 1982, Library of Congress, Catalog No. 72–179437, IEEE Catalog No. 92CH1767–3 IT, pp. 114–115.
A. J. Menezes et al., "Handbook of Applied Cryptography", 1997, Library of Congress catalog No. 96–27609, pp. 89, 612–613.
Kenneth H. Rosen, "Elementary Number Theory and Its Applications," 2nd Edition, Copyright 1988 by Bell Telephone Laboratories and Kenneth H. Rosen, p. 97 (4 p.).
Micali et al., "Accountable–Subgroup Multisignatures", CCS '01, Proceedings of the Eighth ACM Conference on Computer and Communications Security, @ACM 2001, Aug. 15, 2001, pp. 1–18.
Menezes et al., Handbook of Applied Cryptography, CRC Press, 1997, Chapter 8, "Public–Key Encryption", pp. 283–319.
Bruce Schneier: "Applied Cryptography" Second Edition, Jan. 1, 1996, John Wiley & sons, USA, XP002283138, pp. 466–474.
European Search Report, dated Oct. 11, 2004; App No. EP 95 3075.
P. J. Flinn et al. Using the RSA Algorithm for Encryption and Digital Signatures: Can you Encrypt, Decrypt, Sign and Verify without Infringing the RSA Patent? Jul. 9, 1997, Alston & Bird LLP, http://www.cyberlaw.com/rsa.html.
International Search Report (PCT), ISA/US; Apr. 6, 1998.*

* cited by examiner

PUBLIC KEY CRYPTOGRAPHIC APPARATUS AND METHOD

Matter enclosed in heavy brackets [ ] appears in the original patent but forms no part of this reissue specification; matter printed in italics indicates the additions made by reissue.

This application claims the benefit of U.S. Provisional Application No. 60/033,271 for PUBLIC KEY CRYTOGRAPHIC APPARATUS AND METHOD, filed Dec. 9, 1996, naming as inventors, Thomas [Colins] *Collins*, Dale Hopkins, Susan Langford and [Michale] *Michael* Sabin, the [discolsure] *disclosure* of which is incorporated by reference.

BACKGROUND OF THE INVENTION

This invention relates generally to communicating data in a secure fashion, and more particularly to a cryptographic system and methods using public key cryptography.

Computer systems are found today in virtually every walk of life for storing, maintaining, and transferring various types of data. The integrity of large portions of this data, especially that portion relating to financial transactions, is vital to the health and survival of numerous commercial enterprises. Indeed, as open and unsecured data communications channels for sales transactions gain popularity, such as credit card transactions over the Internet, individual consumers have an increasing stake in data security.

Thus, for obvious reasons, it is important that financial transaction communications pass from a sender to an intended receiver without intermediate parties being able to interpret the transferred message.

Cryptography, especially public key cryptography, has proven to be an effective and convenient technique of enhancing data privacy and authentication. Data to be secured, called plaintext, is transformed into encrypted data, or ciphertext, by a predetermined encryption process of one type or another. The reverse process, transforming ciphertext into plaintext, is termed decryption. Of particular importance to this invention is that the processes of encryption and decryption are controlled by a pair of related cryptographic keys. A "public" key is used for the encryption process, and a "private" key is used to decrypt ciphertext. The public key transforms plaintext to ciphertext, but cannot be used to decrypt the ciphertext to retrieve the plaintext therefrom.

As an example, suppose a Sender A wishes to send message M to a recipient B. The idea is to use public key E and related private key D for encryption and decryption of M. The public key E is public information while D is kept secret by the intended receiver. Further, and importantly, although E is determined by D, it is extremely difficult to compute D from E. Thus the receiver, by publishing the public key E, but keeping the private key D secret, can assure senders of data encrypted using E that anyone who intercepts the data will not be able to decipher it. Examples of the public key/private key concept can be found in U.S. Pat. Nos. 4,200,770, 4,218,582, and 4,424,414.

The prior art includes a number of public key schemes, in addition to those described in the above-identified patents. Over the past decade, however, one system of public key cryptography has gained popularity. Known generally as the "RSA" scheme, it is now thought by many to be a worldwide defacto standard for public key cryptography. The RSA scheme is described in U.S. Pat. No. 4,405,829 which is fully incorporated herein by this reference.

The RSA scheme capitalizes on the relative ease of creating a composite number from the product of two prime numbers whereas the attempt to factor the composite number into its constituent primes is difficult. The RSA scheme uses a public key E comprising a pair of positive integers n and e, where n is a composite number of the form $$n=p\cdot q \tag{1}$$

where p and q are different prime numbers, and e is a number relatively prime to (p−1) and (q−1); that is, e is relatively prime to (p−1) or (q−1) if e has no factors in common with either of them. Importantly, the sender has access to n and e, but not to p and q. The message M is a number representative of a message to be transmitted wherein $$0\leqq M<n-1. \tag{2}$$

The sender enciphers M to create ciphertext C by computing the exponential $$[C=M^e(\text{mod } n)]\ C\equiv M^e(mod\ n). \tag{3}$$

The recipient of the ciphertext C retrieves the message M using a (private) decoding key D, comprising a pair of positive integers d and n, employing the relation $$[M=C^d(\text{mod } n)]\ M\equiv C^d(mod\ n) \tag{4}$$

As used in (4), above, d is a multiplicative inverse of $$e(\text{mod}(\text{lcm}((p-1), (q-1)))) \tag{5}$$

so that $$[e\cdot d=1(\text{mod}(\text{lcm}((p-1), (q-1))))]\ e\cdot d\equiv 1(mod(lcm((p-1), (q-1)))) \tag{6}$$

where lcm((p−1), (q−1)) is the least common multiple of numbers p−1 and q−1. Most commercial implementations of RSA employ a different, although equivalent, relationship for obtaining d:

$$[d=e^{-1}\text{mod}(p-1)\ (q-1)]\ d\equiv e^{-1}mod((p-1)\cdot(q-1)). \tag{7}$$

This alternate relationship simplifies computer processing.

Note: Mathematically (6) defines a set of numbers and (7) defines a subset of that set. For implementation, (7) or (6) usually is interpreted to mean d is the smallest positive element in the set.)

The net effect is that the plaintext message M is encoded knowing only the public key E (i.e., e and n). The resultant ciphertext C can only decoded using decoding key D. The composite number n, which is part of the public key E, is computationally difficult to factor into its components, prime numbers p and q, a knowledge of which is required to decrypt C.

From the time a security scheme, such as RSA, becomes publicly known and used, it is subjected to unrelenting attempts to break it. One defense is to increase the length (i.e., size) of both p and q. Not long ago it was commonly recommended that p and q should be large prime numbers 75 digits long (i.e., on the order of $10^{75}$). Today, it is not uncommon to find RSA schemes being proposed wherein the prime numbers p and q are on the order of 150 digits long. This makes the product of p and q a 300 digit number. (There are even a handful of schemes that employ prime numbers (p and q) that are larger, for example 300 digits long to form a 600 digit product.) Numbers of this size, however, tend to require enormous computer resources to perform the encryption and decryption operations. Consider that while computer instruction cycles are typically measured in nanoseconds (billionths of seconds), computer computations of RSA steps are typically measured in milliseconds (thousandths of seconds). Thus millions of computer cycles are required to compute individual RSA steps resulting in noticeable delays to users.

This problem is exacerbated if the volume of ciphertext messages requiring decryption is large—such as can be expected by commercial transactions employing a mass communication medium such as the Internet. A financial institution may maintain as Internet site that could conceivably receive thousands of enciphered messages every hour that must be decrypted, and perhaps even responded to. Using larger numbers to form the keys used for an RSA scheme can impose severe limitations and restraints upon the institution's ability to timely respond.

Many prior art techniques, while enabling the RSA scheme to utilize computers more efficiently, nonetheless have failed to keep pace with the increasing length of n, p, and q.

Accordingly, it is an object of this invention to provide a system and method for rapid encryption and decryption of data without compromising data security.

It is another object of this invention to provide a system and method that increases the computational speed of RSA encryption and decryption techniques.

It is still another object of this invention to provide a system and method for implementing an RSA scheme in which the [components] *factors* of n do not increase in length as n increases in length.

It is still another object to provide a system and method for utilizing multiple (more than two), distinct prime number [components] *factors* to create n.

It is a further object to provide a system and method for providing a technique for reducing the computational effort for calculating exponentiations in an RSA scheme for a given length of n.

SUMMARY OF THE INVENTION

The present invention discloses a method and apparatus for increasing the computational speed of RSA and related public key schemes by focusing on a neglected area of computation inefficiency. Instead of $n=p\cdot q$, as is universal in the prior art, the present invention discloses a method and apparatus wherein n is developed from three or more distinct *random* prime numbers; i.e., $n=p_1\cdot p_2\cdot \ldots \cdot p_k$, where k is an integer greater than 2 and $p_1, p_2, \ldots p_k$ are sufficiently large distinct *random* primes. Preferably, "sufficiently large primes" are prime numbers that are numbers approximately 150 digits long or larger. The advantages of the invention over the prior art should be immediately apparent to those skilled in this art. If, as in the prior art, p and q are each on the order of, say, 150 digits long, then n will be on the order of 300 digits long. However, three primes $p_2$, $p_1$, and $p_3$ employed in accordance with the present invention can each be on the order of 100 digits long and still result in n being 300 digits long. Finding and verifying 3 distinct primes, each 100 digits long, requires significantly fewer computational cycles than finding and verifying 2 primes each 150 digits long.

The commercial need for longer and longer primes shows no evidence of slowing; already there are projected requirements for n of about 600 digits long to forestall incremental improvements in factoring techniques and the ever faster computers available to break ciphertext. The invention, allowing 4 primes each about 150 digits long to obtain a 600 digit n, instead of two primes about [350] *300* digits long, results in a marked improvement in computer performance. For, not only are primes that are 150 digits in size easier to find and verify than ones on the order of [350] *300* digits, but by applying techniques the inventors derive from the Chinese Remainder Theorem (CRT), public key cryptography calculations for encryption and decryption are completed much faster—even if performed serially on a single processor system. However, the inventors' techniques are particularly adapted to [be] advantageously apply [enable] *RSA* public key *cryptographic* operations to parallel computer processing.

The present invention is capable of [using] *extending* the RSA scheme to perform encryption and decryption operation using a large (many digit) n much faster than heretofore possible. Other advantages of the invention include its employment for decryption without the need to revise the RSA public *key* encryption transformation scheme currently in use on thousands of large and small computers.

A key assumption of the present invention is that n, composed of 3 or more sufficiently large distinct prime numbers, is no easier (or not very much easier) to factor than the prior art, two prime number n. The assumption is based on the observation that there is no indication in the prior art literature that it is "easy" to factor a product consisting of more than two sufficiently large, distinct prime numbers. This assumption may be justified given the continued effort (and failure) among experts to find a way "easily" to break large [component] *composite* numbers into their large prime factors. This assumption is similar, in the inventors' view, to the assumption underlying the entire field of public key cryptography that factoring composite numbers made up of two distinct primes is not "easy." That is, the entire field of public key cryptography is based not on mathematical proof, but on the assumption that the empirical evidence of failed sustained efforts to find a way systematically to solve NP problems in polynomial time indicates that these problems truly are "difficult."

The invention is preferably implemented in a system that employs parallel operations to perform the encryption, decryption operations required by the RSA scheme. Thus, there is also disclosed a cryptosystem that includes a central processor unit (CPU) coupled to a number of exponentiator elements. The exponentiator elements are special purpose arithmetic units designed and structured to be provided message data M, an encryption key e, and a number n (where [$n=p_1*p_2*\ldots p_k$] $n=p_1\cdot p_2\cdot \ldots \cdot p_k$, k being greater than 2) and return ciphertext C according to the relationship, $$[C=M^e(\mathrm{mod}(n))]\ C\equiv M^e(mod\ n).$$

Alternatively, the exponentiator elements may be provided the ciphertext C, a decryption (private) key d and n to return M according to the relationship, $$[M=C^d(\mathrm{mod}(n))]\ M\equiv C^d(mod\ n).$$

According to this *decryption* aspect of the invention, the CPU receives a task, such as the requirement to decrypt [cyphertext] *ciphertext* data C. The CPU will also be provided, or have available, a [public] *private* key [e] *d* and n, and the factors of n ($p_1, p_2, \ldots p_k$). The CPU breaks the [encryption] *decryption* task down into a number of sub-tasks, and delivers the sub-tasks to the exponentiator elements. [When the] *The* results of the sub-tasks are returned by the exponentiator elements to the CPU which [will], using a form of the CRT, combine*s* the results to obtain the message data M. An encryption task may be performed essentially in the same manner by the CPU and its use of the exponentiator elements. However, usually the factors of n are not available to the sender (encryptor), only the public key, e and n, so that no sub-tasks are created.

In a preferred embodiment of this latter aspect of the invention, the bus structure used to couple the CPU and exponentiator elements to one another is made secure by encrypting all important information communicated thereon. Thus, data sent to the exponentiator elements is passed through a data encryption unit that employs, preferably, the ANSI Data Encryption Standard (DES). The exponentiator elements decrypt the DES-encrypted sub-task information they receive, perform the desired task, and encrypt the result, again using DES, for return to the CPU.

DETAILED DESCRIPTION OF PREFERRED EMBODIMENTS

Figure 1:
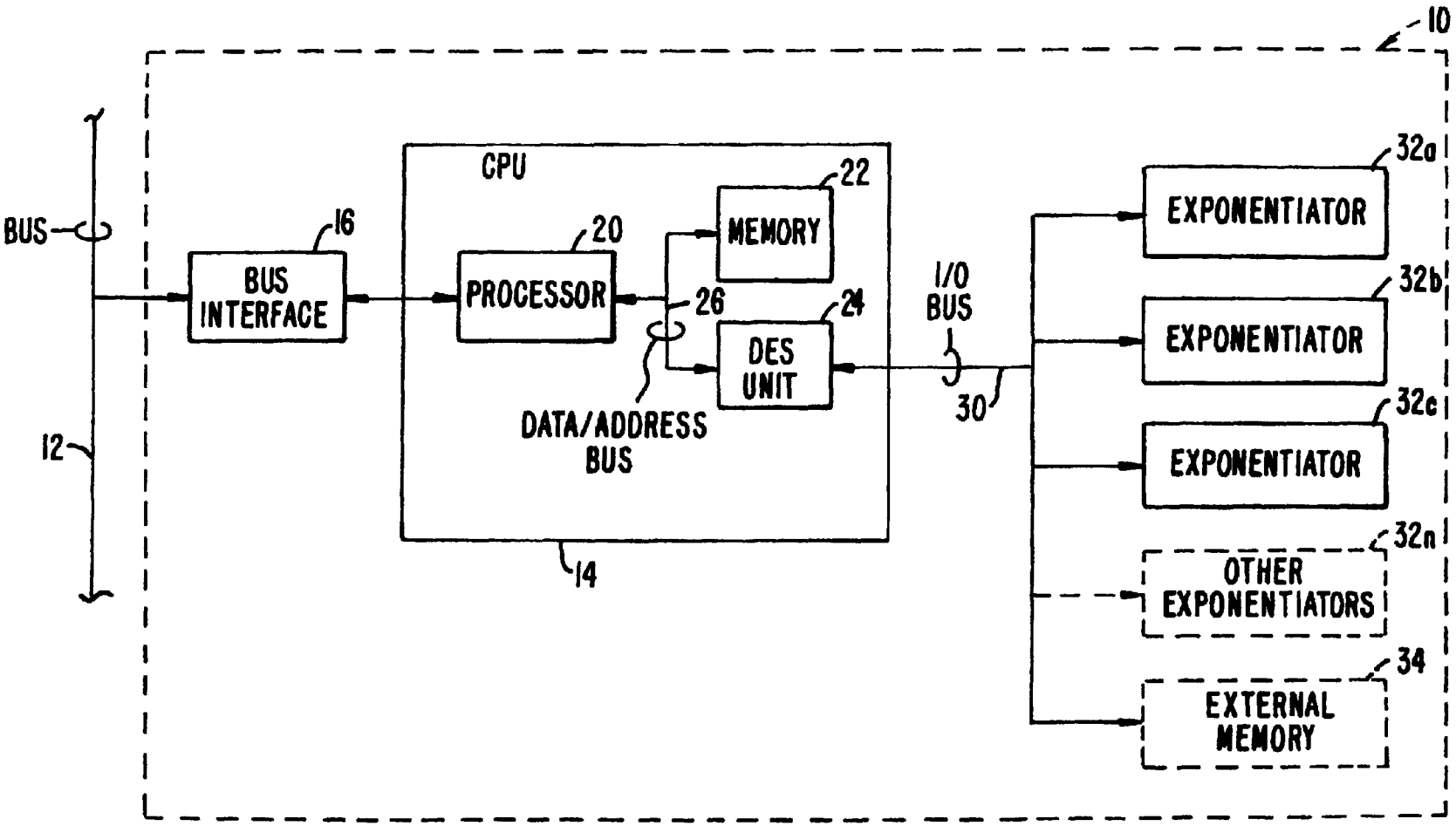
FIG. 1 is a simplified block diagram of a cryptosystem architecture configured for use in the present invention.

As indicated above, the present invention is employed in the context of the RSA public key encryption/decryption scheme. As also indicated, the RSA scheme obtains its security from the difficulty of factoring large numbers, and the fact that the public and private keys are functions of a pair of large (100–200 digits or even larger) prime numbers. Recovering the plaintext from the public key and the ciphertext is conjectured to be equivalent to factoring the product of two primes.

According to the present invention, the public key portion e is picked. Then, three or more random large, distinct prime numbers, $p_1, p_2, \ldots, p_k$ are developed and checked to ensure that each $(p_i-1)$ is relatively prime to e. Preferably, the prime numbers are of equal length. Then, the product [$n=p_1, p_2, \ldots, p_k$] $n=p_1 \cdot p_2 \cdot \ldots p_k$, is computed.

Finally, the decryption [key] *exponent*, d, is established by the relationship:

$$[d=e^{-1}\bmod ((p_1-1)\ (p_2-1))\ \ldots\ (p_k-1))]\quad d\equiv e^{-1} mod((p_1-1)\cdot(p_2-1)\cdot\ldots\cdot(p_k-1)),\ \textit{or equivalently}$$

$$d\equiv e^{-1} mod(lcm((p_1-1),(p_2-1),\ldots(p_k-1)))$$

The message data, M is encrypted to ciphertext C using the relationship of (3), above, i.e., $$[C=M^e \bmod n]\quad C\equiv M^e(mod\ n).$$

To decrypt the ciphertext, C, the relationship of [(3)] (*4*), above, is used:

$$[M=C^d \bmod n]\quad M\equiv C^d(mod\ n)$$

where n and d are those values identified above.

*Alternatively, a message data M can be encoded with the private key to a signed message data $M_s$ using a relationship of the form*

$$M_s\equiv M^d(mod\ n).$$

*The message data M can be reproduce from the signed message data $M_s$ by decoding the signed data with the public key, using a relationship of the form*

$$M\equiv M_s^e(mod\ n).$$

Using the present invention involving three primes to develop the product n, RSA encryption and decryption time can be substantially less than an RSA scheme using two primes by dividing the encryption or decryption task into sub-tasks, one sub-task for each distinct prime. (However, breaking the encryption or decryption into subtasks requires knowledge of the factors of n. This knowledge is not usually available to anyone except the owner of the key, so the encryption process can be accelerated only in special cases, such as encryption for local storage. A system encrypting data for another user performs the encryption process according to (3), independent of the number of factors of n. Decryption, on the other hand, is performed by the owner of a key, so the factors of n are generally known and can be used to accelerate the process.) For example, assume that three distinct primes, $p_1$, $p_2$, and $p_3$, are used to develop the product n. Thus, decryption of the ciphertext, C, using the relationship $$[M=C^d(\bmod n)]\quad M\equiv C^d(mod\ n)$$

is used to develop the decryption sub-tasks:

$$[M_1=C_1^{d_1}\bmod p_1]\quad M_1\equiv C_1^{d_1}(mod\ p_1)$$

$$[M_2=C_2^{d_2}\bmod p_2]\quad M_2\equiv C_2^{d_2}(mod\ p_2)$$

$$[M_3=C_3^{d_3}\bmod p_3]\quad M_3\equiv C_3^{d_3}(mod\ p_3)$$

where $$[C_1=C\bmod p_1;]\quad C_1\equiv C(mod\ p_1);$$

$$[C_2=C\bmod p_2;]\quad C_2\equiv C(mod\ p_2);$$

$$[C_3=C\bmod p_3;]\quad C_3\equiv C(mod\ p_3);$$

$$[d_1=d\bmod (p_1-1)]\quad d_1\equiv d(mod(p_1-1));$$

$$[d_2=d\bmod (p_2-1)]\quad d_2\equiv d(mod(p_2-1));\ \text{and}$$

$$[d_3=d\bmod (p_3-1)]\quad d_3\equiv d(mod(p_3-1)).$$

The results of each sub-task, $M_1$, $M_2$, and $M_3$ can be combined to produce the plaintext, M, by a number of techniques. However, it is found that they can most expeditiously be combined by a form of the Chinese Remainder Theorem (CRT) using, preferably, a recursive scheme. Generally, the plaintext M is obtained from the combination of the individual sub-tasks by the following relationship:

$$[Y_i=Y_{i-1}+[(M_i-Y_{i-1})\ (w_i^{-1}\bmod p_i)\bmod p_i]\cdot w_i \bmod n]\quad Y_i\equiv Y_{i-1}+((M_1-Y_{i-1})(w_i^{-1}(mod\ p_i)))mod\ p_i))\cdot w_i(mod\ n)$$

where $$[i\geqq 2]\quad 2\leqq i\leqq k$$

*where k is the number of prime factors of n*, and $$M = Y_k,\ Y_1 = C_1\ \text{and}\ w_i = \prod_{j<1} p_j$$

Encryption is performed in much the same manner as that used to obtain the plaintext M, provided (as noted above) the factors of n are available. Thus, the relationship $$[C=M^e(\bmod n)]\quad C\equiv M^e(mod\ n),$$

can be broken down into the three sub-tasks, $$[C_1=M_1^{e1}\bmod p_1]\ C_1\equiv M_1^{e1}(mod\ p_1),$$

$$[C_2=M_2^{e2}\bmod p_2]\ C_2\equiv M_2^{e2}(mod\ p_2)\ and$$

$$[C_3=M_3^{e3}\bmod p_3]\ C_3\equiv M_3^{e3}(mod\ p_3),$$

where $$[M_1=M(\bmod p_1)]\ M_1\equiv M\ (mod\ p_1),$$

$$[M_2=M(\bmod p_2)]\ M_2\equiv M\ (mod\ p_2),$$

$$[M_3=M(\bmod p_3)]\ M_3\equiv M\ (mod\ p_3),$$

$$[e_1=e\bmod (p_1-1)]\ e_1\equiv e\ (mod(p_1-1)),$$

$$[e_2=e\bmod (p_2-1)]\ e_2\equiv e(mod(p_2-1),\ \text{and}$$

$$[e_3=e\bmod (p_3-1)]\ e_3\equiv e(mod(p_3-1)).$$

In generalized form, the [decrypted] *ciphertext C* (*i.e., encrypted* message M) can be obtained by [the same summation] *a recursive scheme as* identified above to obtain the ciphertext C from its contiguous constituent sub-tasks $C_i$.

Preferably, the recursive CRT method described above is used to obtain either the ciphertext[,] C[,] or the deciphered plaintext (message) M due to its speed. However, there may be [occasions] *implementations* when it is beneficial to use a non-recursive technique in which case the following relationships are used:

$$M \equiv \sum_{i=1} M_i(w_i^{-1}(mod\ p_i))\cdot w_i(mod n)$$

$$[M = \sum_{i=1} M_i(w_i^{-1}\bmod p_1)w_i\bmod n]$$

where $$[w_i = \prod_{j\neq 1} p_j]$$

$$w_i = \prod_{j\neq 1} p_j,\quad \text{and}$$

k is the number (3 or more) of distinct primes chosen to develop the product n.

Thus, for example above (k=3), M is constructed from the returned sub-task values $M_1$, $M_2$, $M_3$ by the relationship $$[M=M_1(w_1^{-1}\bmod p_1)\ w_1\bmod/n+M_2(w_2^{-1}\bmod p_2)\ w_2\bmod n+M_3(w_3^{-1}\bmod p_3)\ w_3\bmod n]$$

$$M=M_1^{-1}(w_1^{-1}(mod\ p_1))\cdot w_1(mod\ n)+M_2(w_2^{-1}(mod\ p_2))\cdot w_2(mod\ n)+M_3(w_3^{-1}(mod\ p_3))\cdot w_3(mod\ n)$$

where $$w_1=p_2p_3,\ w_2=p_1p_3,\ \text{and}\ w_3=p_1p_2.$$

Employing the multiple distinct prime number technique of the present invention in the RSA scheme can realize accelerated processing over that using only two primes for the same size n. The invention can be implemented on a single processor unit or even the architecture disclosed in the above-referenced U.S. Pat. No. 4,405,829. The capability of developing sub-tasks for each prime number is particularly adapted to employing a parallel architecture such as that illustrated in FIG. 1.

Turning to FIG. 1, there is illustrated a cryptosystem architecture apparatus capable of taking particular advantage of the present invention. The cryptosystem, designated with the reference numeral 10, is structured to form a part of a larger processing system (not shown) that would deliver to the cryptosystem 10 encryption and/or decryption requests, receiving in return the object of the request—an encrypted or decrypted value. The host would include a bus structure 12, such as a peripheral component interface (PCI) bus for communicating with the cryptosystem 10.

As FIG. 1 shows, The cryptoprocessor 10 includes a central processor unit (CPU) 14 that connects to the bus structure 12 by a bus interface 16. The CPU 14 comprises a processor element 20, a memory unit 22, and a data encryption standard (DES) unit 24 interconnected by a data/address bus 26. The DES unit 24, in turn, connects to an input/output (I/O) bus 30 (through appropriate driver/receiver circuits—not shown).

The I/O bus 30 communicatively connects the CPU to a number of exponentiator elements [$\mathbf{32}_a$, $\mathbf{32}_b$, and $\mathbf{32}_c$] *32a, 32b and 32c*. Shown here are three exponentiator elements, although as illustrated by the "other" exponentiators [$\mathbf{32}_n$] *32n*, additional exponentiator elements can be added. Each exponentiator element is a state machine controlled arithmetic circuit structured specifically to implement the relationship described above. Thus, for example, the exponentiator 32a would be provided the values $M_1$, $e_1$, and $p_1$ [, n] to develop $C_1$. Similarly, the exponentiator circuits 32b and 32c develop $C_2$ and $C_3$ from corresponding subtask values $M_2$, $e_2$, [$P_2$] $p_2$, $M_3$, $e_3$, and [$P_3$] $p_3$.

Preferably, the CPU 14 is formed on a single integrated circuit for security reasons. However, should there be a need for more storage space than can be provided by the "on-board" memory 22, the bus 30 may also connect the CPU 14 to an external memory unit 34.

In order to ensure a secure environment, it is preferable that the cryptosystem 10 meet the Federal Information [Protection System] *Processing Standard* (FIPS) *140-1* level 3. Accordingly, the elements that make up the CPU 14 would be implemented in a design that will be secure from external probing of the circuit. However, information communicated on the I/O bus 30 between the CPU 14 and the exponentiator circuits 32 (and external memory 34—if present) is exposed. Consequently, to maintain the security of that information, it is first encrypted by the DES unit 24 before it is placed on the I/O bus 30 by the CPU 14. The exponentiator circuits 32, as well as the external memory 34, will also include similar DES units to decrypt information received from the CPU, and later to encrypt information returned to the CPU 14.

It may be that not all information communicated on the I/O bus 30 need be secure by DES encryption. For that reason, the DES unit 24 of the CPU 14 is structured to encrypt outgoing information, and decrypt incoming information, on the basis of where in the address space used by the cryptosystem the information belongs; that is, since information communicated on the I/O bus 30 is either a write operation by the CPU 14 to the memory 34, or a read operation of those elements, the addresses assigned to the secure addresses and non-secure addresses. Read or write operations conducted by the CPU 14 using secure addresses will pass through the DES unit 24 and that of the memory 34. Read or write operations involving non-secure addresses will by-pass these DES units.

Figure 2:
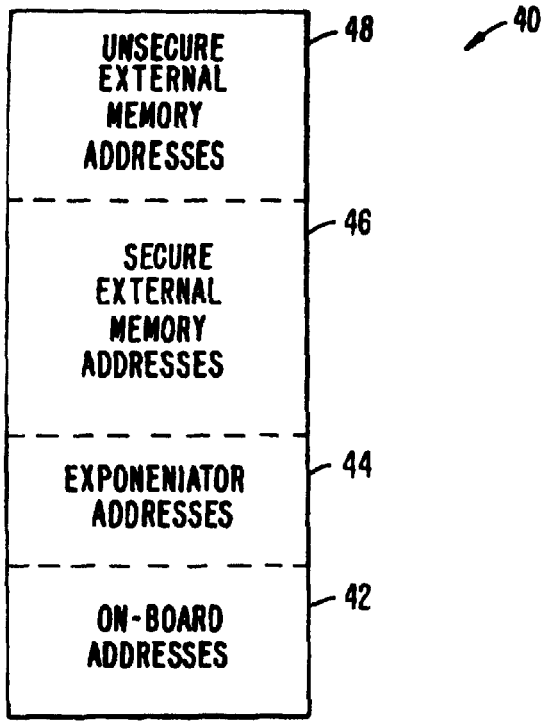
FIG. 2 is a memory map of the address space of the cryptosystem of FIG. 1.

FIG. 2 diagrammatically illustrates a memory map 40 of the address space of the cryptosystem 10 that is addressable by the processor 20. As the memory map 30 shows, an address range 30 provides addresses for the memory 22, and such other support circuitry (e.g., registers—not shown) that may form a part of the CPU 14. The addresses used to write information to, or read information from, the exponentiator elements 32 are in the address range 44 of the memory map 40. The addresses for the external memory 34 are in the address ranges 46, and 48. The address ranges 44 and 46 are for secure read and write operations. Information that must be kept secure, such as instructions for implementing algorithms, encryption/decryption keys, and the like, if maintained in external memory 34, will be stored at locations having addresses in the address range 46. Information that need not be secure such as miscellaneous algorithms data, general purpose instructions, etc. are kept in memory locations of the external memory 34 having addresses within the address range 48.

The DES unit 24 is structured to recognize addresses in the memory spaces 44, 46, and to automatically encrypt the information before it is applied to the I/O bus 30. The DES unit 24 is bypassed when the processor 20 accesses addresses in the address range 48. Thus, when the processor 20 initiates write operations to addresses within the memory space within the address range 46 (to the external memory 34), the DES unit 24 will automatically encrypt the information (not the addresses) and place the encrypted information on the I/O bus 30. Conversely, when the processor 20 reads information from the external memory 34 at addresses within the address range 46 of the external memory 34, the DES unit will decrypt information received from the I/O bus 30 and place the decrypted information on the data/address bus 26 for the processor 20.

In similar fashion, information conveyed to or retrieved from the exponentiators 32 by the processor 20 by write or read operations at addresses within the address range 44. Consequently, writes to the exponentiators 32 will use the DES unit 24 to encrypt the information. When that (encrypted) information is received by the exponentiators 32, it is decrypted by on-board DES units (of each exponentiator 32). The result[s] of the task performed by the exponentiator 32 is then encrypted by the exponentiator's on-board DES unit, retrieved by the processor 20 in encrypted form and then decrypted by the DES unit 24.

Information that need not be maintained in secure fashion to be stored in the external memory 34, however, need only be written to addresses in the address range 48. The DES unit 24 recognizes writes to the address range 48, and bypasses the encryption circuitry, passing the information, in unencrypted form, onto the I/O bus 30 for storing in the external memory 34. Similarly, reads of the external memory 34 using addresses within the address range 48 are passed directly from the I/O bus 30 to the data/address bus 26 by the DES unit 24.

In operation, the CPU 14 will receive from the host it serves (not shown), via the bus 12, an encryption request. The encryption request will include the message data M to be encrypted and, perhaps, the encryption keys e and n (in the form of the primes $p_1, p_2, \ldots p_k$). Alternatively, the keys may be kept by the CPU 14 in the memory 22. In any event, the processor 20 will construct the encryption sub-tasks $C_1, C_2, \ldots, C_k$ for execution by the exponentiators 32.

Assume, for the purpose of the remainder of this discussion, that the encryption/decryption tasks performed by the cryptosystem 10, using the present invention, employs only three distinct primes, $p_1, p_2, p_3$. The processor 20 will develop the sub tasks identified above, using M, e, $p_1$ $p_2$, $p_3$ Thus, for example, if the exponentiator 32a were assigned the sub-task of developing $C_1$, the processor would develop the values $M_1$[,] *and* $e_1$[, and $(p_1-1)$] and deliver [units] (write) these values, with [n,] $p_1$ to the exponentiator 32a. Similar values will be developed by the processor 20 for the sub-tasks that will be delivered to the exponentiators 32b and 32c.

In turn, the exponentiators 32 develop the values $C_1$, $C_2$, and $C_3$ which are returned to (retrieved by) the CPU 14. The processor 20 will then combine the values $C_1$, $C_2$, and $C_3$ to form C, the ciphertext encryption of M, which is then returned to the host via the bus 12.

Figure 3:
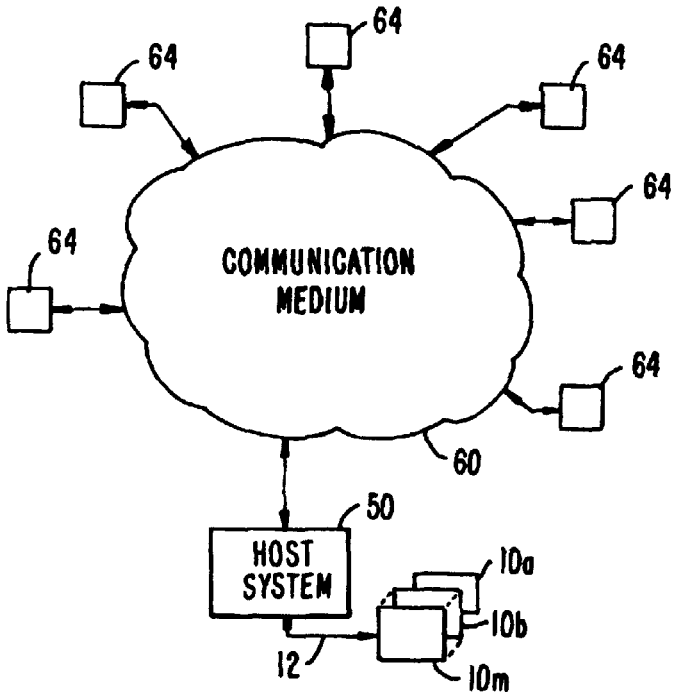
FIG. 3 is an exemplary illustration of one use of the invention.

The encryption, decryption techniques described hereinabove, and the use of cryptosystem 10 (FIG. 1) can find use in a number of diverse environments. Illustrated in FIG. 3 is one such environment. FIG. 3 shows a host system 50, including the bus 12 connected to a plurality of cryptosystems 10 (10a, 10b, . . . , 10m) structured as illustrated in FIG. 1, and described above. In turn, the host system 50 connects to a communication medium 60 which could be, for example, an internet connection that is also used by a number of communicating stations 64. For example, the host system 50 may be employed by a financial institution running a web site accessible, through the communication medium, by the stations 64. Alternatively, the communication medium may be implemented by a local area network (LAN) or other type network. Use of the invention described herein is not limited to the particular environment in which it is used, and the illustration in FIG. 3 is not meant to limit in any way how the invention can be used.

As an example, the host system, as indicated, may receive encrypted communication from the stations 64, via the communication medium 60. Typically, the data of the communication will be encrypted using DES, and the DES key will be encrypted using a public key by the RSA scheme, preferably one that employs three or more distinct prime numbers for developing the public and private keys.

Continuing, the DES encrypted communication, including the DES key encrypted with the RSA scheme, would be received by the host system. Before decrypting the DES communication, it must obtain the DES key and, accordingly, the host system 50 will issue, to one of the cryptosystems 10 a decryption request instruction, containing the encrypted DES key as the cyphertext C. If the (private) decryption keys, d, n (and its component primes, $p_1, p_2, \ldots p_k$) are not held by the cryptosystem 10, they also will be delivered with the encryption request instruction.

In turn, the cryptosystem 10 would decrypt the received cyphertext in the manner described above (developing the sub-tasks, issuing the sub-tasks to the exponentiator 32 of the cryptosystem 10, and reassembling the results of the sub-task to develop the message data: the DES key), and return to the host system the desired, decrypted information.

Alternatively, the [post] *host*-system 50 may desire to deliver, via the communication medium 60, an encrypted communication to one of the stations 64. If the communication is to be encrypted by the DES scheme, with the DES key encrypted by the RSA scheme, the host system would encrypt the communication, forward the DES key to one of the cryptosystems 10 for encryption via the RSA scheme. When the encrypted DES key is received back from the cryptosystem 10, the host system can then deliver to one or more of the stations 64 the encrypted message.

Of course, the host system 50 and the stations 64 will be using the RSA scheme of public key encryption/decryption. Encrypted communications from the stations 64 to the host system 50 require that the stations 64 have access to the public key [E (E, N)] $E=(e, n)$ while the host system maintains the private key [D (D, N,] $D=(d, n)$ and the constituent primes, $p_1, p_2, \ldots, p_k$). Conversely, for secure communication from the host system 50 to one or more of the stations 64, the host system would retain a public key E' for each station 64, while the stations retain the corresponding private keys [E'] $D'$.

Other techniques for encrypting the communication could used. For example, the communication could be entirely encrypted by the RSA scheme. If, however, the *message to be* communicat[ion]*ed is represented by a numerical value* greater than n−1, it will need to be broken up into blocks size M where $$[0 \leqq M \leqq N-1]\ 0 \leqq M \leqq n-1.$$

Each block M would be separately encrypted/decrypted, using the public key/private key RSA scheme according to that described above.

What is claimed:

1. A method for [establishing cryptographic] communications *of a message cryptographically processed with RSA (Rivest, Shamir & Adleman) public key encryption,* comprising the [step] *steps* of:

*developing k distinct random prime numbers* $p_1, p_2, \ldots, p_k$, *wherein k is an integer greater than 2;*

*providing a number e relatively prime to* $(p_1-1)\cdot(p_2-1)\cdot\ldots\cdot(p_k-1)$;

*providing a composite number n equaling the product* $p_1 \cdot p_2 \cdot \ldots \cdot p_k$;

*receiving a ciphertext word signal C which is formed by* encoding a plaintext message word *signal* M to a ciphertext word signal C, where M corresponds to a number representative of [a] *the* message and $$0 \leqq M \leqq n-1$$

[n being a composite number formed from the product of $p_1 \cdot p_2 \cdot \ldots \cdot p_k$ where k is an integer greater than 2, $p_1$, $p_2, \ldots p_k$ are distinct prime numbers, and] where C is a number representative of an encoded form of *the plaintext* message word *signal* M *such that*

$$C \equiv M^e (mod\ n)$$

*and where e is associated with an intended recipient of the ciphertext word signal C; and*[, wherein said encoding step comprises the step of:

transforming said message word signal M to said ciphertext word signal C whereby $$C = M^e (\text{mod } n)$$

where e is a number relatively prime to $(p_1-1)\cdot(p_2-1)$.]

*deciphering the received ciphertext word signal C at the intended recipient having available to it the k distinct random prime number* $p_1, p_2, \ldots p_k$;

*wherein p and q are a pair of prime numbers that product of which equals a composite number m, the k distinct random prime numbers each smaller than p and q, and the composite number m having the same number of digits as the composite number n;*

*wherein the deciphering step is divided into sub-steps, one sub-step for each of the k distinct random prime numbers; and*

*wherein for a given number of digits for composite numbers n and m, it takes fewer computational cycles to perform the deciphering step if the k distinct random prime numbers are used, relative to the number of computational cycles for performing a deciphering step if the pair of prime numbers p and q is used instead.*

2. The method according to claim 1, [comprising the further step of:] *wherein the deciphering step includes*

*establishing a number, d, as a multiplicative inverse of* $e(mod(lcm((p_1-1), (p_2-1), \ldots (p_k-1))))$, *and* decoding the ciphertext word signal C to the *plaintext* message word signal M[, wherein said decoding step comprises the step of: transforming said ciphertext word signal C,] where[by:

$$M = C^d (\text{mod } n)] \; M \equiv C^d (mod\ n).$$

[where d is a multiplicative inverse of $e(\text{mod}(\text{lcm}((p_1-1), (p_2-1), \ldots, (p_k-1))))$.]

3. A method for [transferring a message signal $M_i$ in a] communications *of a message signal* $M_i$ *cryptographically processed with RSA public key encryption in a* system having j terminals, [wherein] each terminal [is] *being* characterized by an encoding key $E_i=(e_i, n_i)$ and *a* decoding key $D_i=(d_i, n_i)$, where i=1, 2, . . . , j, and [wherein] *the message signal* $M_i$ corresponds to a number representative of a message-to-be-[transmitted] *received* from the $i^{th}$ terminal, *the method comprising the steps of:*

*establishing* $n_i$ *where* $n_i$ is a composite number of the form $$[n_i = P_{i,1} \cdot p_{i,2} \cdot, \ldots, \cdot p_{i,k}] \; n_i = p_{i,1} \cdot p_{i,2} \cdot \ldots \cdot p_{i,k}$$

where k is an integer greater than 2, $p_{i,1}, p_{i,2}, \ldots, p_{i,k}$ are distinct *random* prime numbers, $e_i$ is relatively prime to [$\text{lcm}(p_{i,1}-1, p_{i,2}-1, p_{i,kd}-1)$] *lcm* $(p_{i,1}-1, p_{i,2}-1, \ldots, p_{i,k}-1)$, *and*

$d_i$ is selected from the group consisting of [the] *a* class of numbers equivalent to a multiplicative inverse of $$e_i(\text{mod}(\text{lcm}((p_{i,1}-1), (p_{i,2}-1), \ldots, (p_{i,k}-1))))[.];$$

[comprising the steps of:]

*receiving by a recipient terminal (i=y) from a sender terminal (i=x, x≠y) a ciphertext signal* $C_x$ *formed by* encoding a digital message word signal [$M_A$ for transmission from a first terminal (i=A) to a second terminal (i=B), said encoding step including the sub-step of:] $M_x$, *wherein the encoding includes* transforming said message word signal $M_A$ to one or more message block word signals [$M_A''$] $M_X''$, each block word signal [$M_A''$] $M_X''$ corresponding to a number representative of a portion of said message word signal [$M_A$] $M_X$ in the range [$0 \leqq M_A'' \leqq n_B-1$] $0 \leqq M_X'' \leqq n_y-1$, *and* transforming each of said message block word signals [$M_A''$] $M_X''$ to a ciphertext word signal [$C_A$, $C_A$ corresponding] $C_X$ *that corresponds* to a number representative of an encoded form of said message block word signal [$M_A''$,] $M_X''$ where[by]:

$$[C_A \equiv M_A''^{eB} (\text{mod } n_B.)] \; C_x \equiv M_x''^{ey} (mod\ n_y);\ and$$

*deciphering the received ciphertext word signal* $C_x$ *at the recipient terminal having available to it the k distinct random prime numbers* $p_{y,1}, p_{y,2}, \ldots, p_{y,k}$ for establishing its $d_y$;

*wherein p and q are a pair of prime numbers that product of which equals a composite number m, the k distinct random prime numbers each smaller than p and q, and the composite number m having the same number of digits as the composite number n;*

*wherein the deciphering step is divided into sub-steps, one sub-step for each of the k distinct random prime numbers; and*

*wherein for a given number of digits for composite numbers n and m, it takes fewer computational cycles to perform the deciphering step if the k distinct random prime numbers are used, relative to the number of computational cycles for performing a deciphering step if the pair of prime numbers p and q is used instead.*

4. A [cryptographic communications] system *for communications of a message cryptographically processed with an RSA public key encryption,* comprising:

a communication [medium] *channel for transmitting a ciphertext word signal C*;

[an] encoding means coupled to said channel and adapted for transforming a transmit message word signal M to [a] *the* ciphertext word signal C *using a composite number, n,*

*where n is a product of the form*

$$n=p_1 \cdot p_2 \cdot \ldots \cdot p_k,$$

*where k is an integer greater than 2, and $p_1, p_2, \ldots p_k$ are distinct random prime numbers,* [and for transmitting C on said channel,]

where *the transmit message word signal* M corresponds to a number representative of [a] *the* message and $0 \leqq M \leqq n-1$, [where n is a composite number of the form $$n=p_1 \cdot p_2 \cdot \ldots \cdot p_k$$

where k is an integer greater than 2 and $p_1, p_2, \ldots, p_k$ are distinct prime numbers, and] where *the ciphertext word signal* C corresponds to a number representative of an [enciphered] *encoded* form of said message [and corresponds to] *through a relationship of the form*

$$C \equiv M^e (\text{mod } n), \textit{ and}$$

where e is a number relatively prime to $\text{lcm}(p_1-1, p_2-1, \ldots, p_k-1)$; and

[a] decoding means coupled to said channel and adapted for receiving *the ciphertext word signal* C from said channel and, *having available to it the k distinct random prime numbers $p_1, p_2, \ldots p_k$,* for transforming *the ciphertext word signal* C to a receive message word signal M' where M' corresponds to a number representative of a [deciphered] *decoded* form of *the ciphertext word signal* C [and corresponds to] *through a relationship of the form*

$$M' \equiv C^d (\text{mod } n)$$

where d is selected from the group consisting of [the] *a* class of numbers equivalent to a multiplicative inverse of $$e(\text{mod}(\text{lcm}((p_1-1), (p_2-1), \ldots, (p_k-1)))); \textit{;}$$

*wherein p and q are a pair of prime numbers that product of which equals a composite number m, the k distinct random prime numbers each smaller than p and q, and the composite number m having the same number of digits as the composite number n;*

*wherein transforming the ciphertext word signal C to a receive message word signal M' is divided into sub-steps, one sub-step for each of the k distinct random prime numbers; and*

*wherein for a given number of digits for composite numbers n and m, it takes fewer computational cycles to perform the transforming of the ciphertext word signal C if the k distinct random prime numbers are used, relative to the number of computational cycles for performing a transforming of the ciphertext word signal C if the pair of prime numbers p and q is used instead.*

5. A [cryptographic communications] system *for communications of a message cryptographically processed with an RSA public key encryption, the system* having a plurality of terminals coupled by a communications channel, [including] *comprising:* a first terminal *of the plurality of terminals* characterized by an [associated] encoding key $E_A=(e_A, n_A)$ and *a* decoding key $D_A=(d_A, n_A)$, where[in] $n_A$ is a composite number of the form $$n_A=p_{A,1} \cdot p_{A,2} \cdot \ldots \cdot p_{A,k}$$

where k is an integer greater than 2, $p_{A,1}, p_{A,2}, \ldots, p_{A,k}$ are distinct *random* prime numbers, $e_A$ is relatively prime to $$\text{lcm}(p_{A,1}-1, p_{A,2}-1, \ldots, p_{A,k}-1), \textit{ and}$$

$d_A$ is selected from the group consisting of [the] *a* class of numbers equivalent to a multiplicative inverse of $$e_A(\text{mod}(\text{lcm}((p_{A,1}-1), (p_{A,2}-1), \ldots, (p_{A,k}-1)))) \text{[.]}; \textit{ and}$$

[and including] a second terminal[, comprising:] *of the plurality of terminals having* blocking means for transforming a *first* message[-to-be-transmitted], *which is to be transmitted on said communications channel* from said second terminal to said first terminal, *in*to one or more transmit message word signals $M_B$, where *each* $M_B$ corresponds to a number representative of said *first* message in the range $$0 \leqq M_B \leqq n_A-1, \textit{ and}$$

encoding means coupled to said channel and adapted for transforming each transmit message word signal $M_B$ to a ciphertext word signal $C_B$ *that* [and for transmitting $C_B$ on said channel, where $C_B$] corresponds to a number representative of an [enciphered] *encoded* form of said *first* message [and corresponds to] *through a relationship of the form*

$$[C_B=M_B^{e_A}(\text{mod } n_A)] \; C_B \equiv M_B^{e_A}(\textit{mod } n_A),$$

[wherein] said first terminal [comprises:] *having* decoding means coupled to said channel and adapted for receiving *each of* said ciphertext word signals $C_B$ from said channel and, *having available to it the k distinct random prime numbers $p_{A,1}, p_{A,2}, \ldots, p_{A,k}$,* for transforming each of said ciphertext word signals $C_B$ to a receive message word signal [$M_B$] $M_B'$, and means for transforming said receive message word signal[s M'] $M_B'$ to said *first* message, where [M' is] $M_B'$ *corresponds to* a number representative of a [deciphered] *decoded* form of $C_B$ [and corresponds to] *through a relationship of the form*

$$[M_B'=C_B^{d_A}(\text{mod } n_A)] \; M_B' \equiv C_B^{d_A}(\textit{mod } n_A);$$

*wherein p and q are a pair of prime numbers that product of which equals a composite number m, the k distinct random prime numbers each smaller than p and q, and the composite number m having the same number of digits as the composite number n;*

*wherein transforming said receive message word signal $M_B'$ to said first message is divided into sub-steps, one sub-step for each of the k distinct random prime numbers; and*

*wherein for a given number of digits for composite numbers n and m, it takes fewer computational cycles to perform the transforming of said receive message word signal $M_B'$ if the k distinct random prime numbers are used, relative to the number of computational cycles for performing a transforming of said receive message word signal $M_B'$ if the pair of prime numbers p and q is used instead.*

6. The system according to claim 5 wherein said second terminal is characterized by an [associated] encoding key $E_B=(e_B, n_B)$ and *a* decoding key [$DB=(D_B, d_B)$] $D_B=(d_B, n_B)$, where[:]

$n_B$ is a composite number of the form $$n_B = p_{B,1} \cdot p_{B,2} \cdot \ldots \cdot p_{B,k},$$

where k is an integer greater than 2, $p_{B,1}, p_{B,2}, \ldots, p_{B,k}$ are distinct *random* prime numbers, $e_B$ is relatively prime to $$\mathrm{lcm}(p_{B,1}-1, p_{B,2}-1, \ldots, p_{B,k}-1), \textit{ and}$$

$d_B$ is selected from the group consisting of [the] *a* class of numbers equivalent to a multiplicative inverse of $$e_B(\mathrm{mod}(\mathrm{lcm}((p_{B,1}), (p_{B,2}-1), \ldots, (p_{B,k}-1)))),$$

[wherein] said first terminal [comprises:] *further having* blocking means for transforming a *second* message[-to-be-transmitted], *which is to be transmitted on said communications channel* from said first terminal to said second terminal, to one or more transmit message word signals $M_A$, where *each* $M_A$ corresponds to a number representative of said message in the range $$[0 \leqq M_A^{eB} (\mathrm{mod}\ n_B),]\ 0 \leqq M_A \leqq n_B - 1, \textit{ and}$$

encoding means coupled to said channel and adapted for transforming each transmit message word signal $M_A$ to a ciphertext word signal $C_A$ and for transmitting $C_A$ on said channel, where $C_A$ corresponds to a number representative of an [enciphered] *encoded* form of said *second* message [and corresponds to] *through a relationship of the form*

$$[C_A = M_A^{eB} (\mathrm{mod}\ n_B)]\ C_A \equiv M_A^{eB} (\mathrm{mod}\ n_B); \textit{ and}$$

[wherein] said second terminal [comprises;] *further having* decoding means coupled to said channel and adapted for receiving *each of* said ciphertext word signals $C_A$ from said channel and, *having available to it the k distinct random prime numbers* $p_{B1}, p_{B,2}, \ldots, p_{B,k}$, for transforming each of said ciphertext word signals to a receive message word signal $M_A'$, and means for transforming said receive message word signals [$M_A$] $M_A'$ to said *second* message, where [M'] $M_A'$ corresponds to a number representative of a [deciphered] *decoded* form of [and corresponds to] $C_A$ *through a relationship of the form*

$$[M_A' \equiv C_A^{dB} (\mathrm{mod}\ n_B)]\ M_A' \equiv C_A^{dB} (\mathrm{mod}\ n_B).$$

[7. A method for establishing cryptographic communications comprising the step of:

encoding a digital message word signal M to a cipher text word signal C, where M corresponds to a number representative of a message and $$0 \leqq M \leqq n-1,$$

where n is a composite number having at least 3 whole number factors greater than one, the factors being distinct prime numbers, and where C corresponds to a number representative of an encoded form of message word M, wherein said encoding step comprises the step of:

transforming said message word signal M to said ciphertext word signal C whereby $$C \equiv a_e M^e + a_{e-1} M^{e-1} + \ldots + a_o (\mathrm{mod}\ n)$$

where e and $a_{e,\ ae-1}, \ldots, a_o$ are numbers.]

[8. In the method according to claim 7 wherein said encoding step includes the step of transforming M to C by the performance of a first ordered succession of invertible operations on M, the further step of:

decoding C to M by the performance of a second ordered succession of invertible operations on C, where each of the invertible operations of said second succession is the inverse of a corresponding one of said first succession, and wherein the order of said operations in said second succession is reversed with respect to the order of corresponding operations in said first succession.]

9. A [communication] system for [transferring] *communications of* message signals [$M_i$] *cryptographically processed with RSA public key signing*, comprising:

j [stations,] *terminals including first and second terminals,* each of the j [stations] *terminals* being characterized by an encoding key $E_i = (e_i, n_i)$ and decoding key $D_i = (d_i, n_i)$, where i=1,2, . . . ,j, [and wherein $M_i$ corresponds to a number representative of a message signal to be transmitted from the $i^{th}$ terminal,] *each of the j terminals being adapted to transmit a particular one of the message signals where an* $i^{th}$ *message signals* $M_i$ is transmitted from an $i^{th}$ *terminal* and $$0 \leqq M_i \leqq n_i - 1,$$

$n_i$ [is] *being* a composite number of the form $$[n_i = pi_{i,1} \cdot p_{i,2} \cdot \ldots p_{i,k}]\ n_i = p_{i,1} \cdot p_{i,2} \cdot \ldots \cdot p_{i,k}$$

where k is an integer greater than 2, $p_{i,1}, p_{i,2}, \ldots, p_{i,k}$ are distinct *random* prime numbers, $e_i$ is relatively prime to $\mathrm{lcm}(p_{i,1}-1, p_{i,2}-1, \ldots, p_{i,k}-1)$, *and*

$d_i$ is selected from the group consisting of [the] *a* class of numbers equivalent to a multiplicative inverse of $$e_i(\mathrm{mod}(\mathrm{lcm}((p_{i,1}-1), (p_{i,2}-1), \ldots, (p_{i,k}-1))));$$

[a] *said* first [one of the j terminals] *terminal* including means for encoding a digital message word signal [$M_A$ for transmission] $M_1$ *to be transmitted* from said first terminal (i=[A] *1*) to [a] *said* second [one of the j terminals] *terminal* (i=[B] *2*), [and]

*said encoding* means [for] transforming said *digital* message word signal [$M_{AS}$, $M_{AS}$ corresponding to a number representative of an encoded form of said message word signal $M_A$, whereby:] $M_{1S}$ *using a relationship of the form*

$$[M_{AS} \equiv M_A^{dA} (\mathrm{mod}\ n_A)]\ M_{1S} \equiv M_1^{d1} (\mathrm{mod}\ n_1); \textit{ and}$$

*means for transmitting said signed message word signal* $M_{1S}$ *from said first terminal to said second terminal, wherein said second terminal includes*

*means for decoding said signed message word signal* $M_{1S}$ *to said digital message word signal* $M_1$*;*

*wherein p and q are a pair of prime numbers that product of which equals a composite number m, the k distinct random prime number each smaller than p and q, and the composite number m having the same number of digits as the composite number n;*

*wherein encoding a digital message word signal* $M_1$ *is divided into sub-steps, on sub-step for each of the k distinct random prime numbers; and*

*wherein for a give number of digits for composite numbers n and m, it takes fewer computational cycles to*

*perform the encoding of the digital message word signal $M_i$ if the k distinct random prime numbers are used, relative to the number of computational cycles for performing an encoding of the digital message word signal $M_1$ if the pair of prime numbers p and q is used instead.*

10. The system of claim 9, *wherein the means for decoding signed message word signal $M_{1S}$ includes means for* [further comprising:

means for transmitting said signal message word signal $M_{AS}$ from said first terminal to said second terminal, and wherein said second terminal includes means for decoding said signed message word signal $M_{AS}$ to said message word signal $M_A$, said second terminal including:

means for] transforming said signed message word signal [$M_{AS}$] $M_{1S}$ to said *digital* message word signal [$M_A$, whereby] $M_1$ *using a relationship of the form*

$$[M_A \equiv M_{AS}^{eA} (\text{mod } n_A)]\ M_i \equiv M_{1S}^{e1}\ (mod\ n_1).$$

11. A communication system for transferring a message signal [$M_i$] *cryptographically processed with RSA public key encryption*, the communications system comprising:

j communication stations *including first and second stations,* each *of the j communication stations being* characterized by an encoding key $E_i=(e_i, n_i)$ and *a* decoding key $D_i=(d_i, n_i)$, where i=1, 2, . . . , j, [and wherein $M_i$ corresponds to a number representative of a message signal to be transmitted from the $i^{th}$ terminal,] *each of the j communication stations being adapted to transmit a particular one of the message signals where an $i^{th}$ message signal $M_i$ is received from an $i^{th}$ communication station, and*

$$0 \leqq M_i \leqq n_i - 1$$

$n_i$ [is] *being* a composite number of the form $$n_i = p_{i,1} \cdot p_{i,2} \cdot \ldots \cdot p_{i,k}$$

where k is an integer greater than 2, $p_{i,1}, p_{i,2}, \ldots, p_{i,k}$ are distinct *random* prime numbers, $e_i$ is relatively prime to $\text{lcm}(p_{i,1}-1, p_{i,2}-1, \ldots, p_{i,k}-1)$, *and*

$d_i$ is selected from the group consisting of [the] *a* class of numbers equivalent to a multiplicative inverse of $$e_i(\text{mod}(\text{lcm}((p_{i,1}-1), (p_{i,2}-1), \ldots, (p_{i,k}-1)))),$$

[a] *said* first [one of the j communication stations] *station* including means for encoding a digital message word signal [$M_A$ for transmission] $M_1$ *to be transmitted* from said first [one of the j communication stations] *station* (l=[A] *1*) to [a] *said* second [one of the j communication stations] *station* (l=[B]*2*), means for transforming said *digital* message word signal [$M_A$] $M_1$ to one or more message block word signals [$M_A''$] $M_1''$, each block word signal [$M_A'$] $M_1''$ being a number representative of a portion of said *digital* message word signal [$M_A'$] $M_1$ in the range [$0 \leqq M_A \leqq n_B - 1$,] $0 \leqq M_1'' \leqq n_2 - 1$, and means for transforming each of said message block word signals [$M_A''$] $M_1''$ to a ciphertext word signal [$C_A$, $C_A$ corresponding to a number representative of an encoded form of said message block word signal $M_A''$, whereby:] $C_1$ *using a relationship of the form*

$$[C_A = M_A''^{Eb} (\text{mod } n_B)]\ C_1 \equiv M_1''^{e2} (mod\ n_2);\ and$$

*means for transmitting said ciphertext signals $C_1$ from said first station to said second station, wherein said second station includes*

*means for deciphering said ciphertext signals $C_1$ using $p_{2,1}, p_{2,2}, \ldots p_{2,k}$ to produce said digital message word signal $M_1$;*

*wherein p and q are a pair of prime numbers that product of which equals a composite number m, the k distinct random prime numbers each smaller than p and q, and the composite number m having the same number of digits as the composite number n;*

*wherein deciphering said ciphertext signals $C_1$ is divided into sub-steps, one sub-step for each of the k distinct random prime numbers; and*

*wherein for a given number of digits for composite numbers n and m, it takes fewer computational cycles to perform the deciphering of said ciphertext signals $C_1$ if the k distinct random prime numbers are used, relative to the number of computational cycles for performing a deciphering of said ciphertext signals $C_1$ if the pair of prime numbers p and q is used instead.*

12. The *communications* system of claim 11 [further comprising:

means for transmitting said ciphertext word signals from said first terminal to said second terminal, and] wherein [said second terminal] *the deciphering means* includes means for decoding said cyphertext word signals $C_1$ to said message *block* word signal*s* [MA] $M_1''$ *using a relationship of the form*[, said second terminal including:

means for transforming each of said ciphertext word signals $C_A$ to one of said message block word signals $M_A''$, whereby $$[M_A'' \equiv C_A^{Db} (\text{mod } n_B)]\ M_1'' \equiv C_1^{d2} (mod\ n_2),\ and$$

means for transforming said message block word signals [$M_A''$] $M_1''$ to said message word signal [$M_A$] $M_1$.

[13. In a communications system, including first and second communicating stations interconnected for communication therebetween, the first communicating station having encoding means for transforming a transmit message word signal M to a ciphertext word signal C where M corresponds to a number representative of a message and $$0 \leqq M \leqq n-1$$

where n is a composite number having at least 3 whole number factors greater than one, the factors being distinct prime numbers, and where C corresponds to a number representative of an enciphered form of said message and corresponds to $$C \equiv a_e M^e + a_{e-1} M^{e-1} + \ldots + a_o (\text{mod } n)$$

where e and $a_e$, $a_e-1$, . . . , $a_o$ are numbers; and means for transmitting the ciphertext word signal C to the second communicating station.]

*14. The method according to claim 9, wherein the signed message word signal $M_{1S}$ formed from the digital message word signal $M_1$ being cryptographically processed at the first terminal with multi-prime (k>2) RSA public key signing which is characterized by the composite number n being computed as the product of the k distinct random prime numbers $p_1, p_2, \ldots p_k$, is decipherable at the second terminal with two-prime RSA public key signing characterized by the composite number m being computed as the product of the pair of prime numbers p and q.*

*15. A method of communicating a message cryptographically processed with an RSA public key encryption, comprising the steps of:*

*selecting a public key portion e associated with a recipient intended for receiving the message;*

*developing k distinct random prime numbers, $p_1, p_2, \ldots p_k$, where $k \geqq 3$, and checking that each of the k distinct random prime numbers minus 1, $p_1-1, p_2-1, \ldots, p_k-1$, is relatively prime to the public key portion e;*

*computing a composite number, n, as a product of the k distinct random prime numbers;*

*receiving a ciphertext message formed by encoding a plaintext message data M to the ciphertext message data C using a relationship of the form*

$$C \equiv M^e (mod\ n)$$

*where M represents the message, where $0 \leqq M \leqq n-1$, and where the sender knows n and the public key portion e but has no access to the k distinct random prime numbers, $p_1, p_2, \ldots p_k$; and*

*deciphering at the recipient the received ciphertext message data C to produce the message, the recipient having access to the k distinct random prime numbers, $p_1, p_2, \ldots p_k$;*

*wherein p and q are a pair of prime numbers that product of which equals a composite number m, the k distinct random prime numbers each smaller than p and q, and the composite number m having the same number of digits as the composite number n;*

*wherein the deciphering step is divided into sub-steps, one sub-step for each of the k distinct random prime numbers; and*

*wherein for a given number of digits for composite numbers n and m, it takes fewer computational cycles to perform the deciphering step if the k distinct random prime numbers are used, relative to the number of computational cycles for performing a deciphering step if the pair of prime numbers p and q is used instead.*

*16. The method according to claim 15, comprising the further step of:*

*establishing a private key portion d by a relationship to the public key portion e in the form of $d \equiv e^{-1}(mod((p_1-1)\cdot(p_2-1)\cdot \ldots \cdot(p_k-1)))$,*

*wherein the deciphering step includes decoding the ciphertext message data C to the plaintext message data M using a relationship of the form $M \equiv C^d (mod\ n)$.*

*17. The method according to claim 15, wherein a message cryptographically processed by the sender with two-prime RSA public key encryption characterized by the composite number m being computed as the product of the pair of prime numbers p and q, is decipherable with multi-prime (k>2) RSA public key encryption characterized by the composite number n being computed as the product of the k distinct random prime numbers $p_1, p_2, \ldots p_k$.*

*18. The method according to claim 15, wherein n and m include values that are more than 600 digits long.*

*19. A method of communicating a message cryptographically processed with RSA public key encryption, comprising the steps of:*

*selecting a public key portion e;*

*developing k distinct random prime numbers $p_1, p_2, \ldots p_k$, where $k \geqq 3$, and checking that each of the k distinct random prime numbers minus 1, $p_1-1, p_2-1, \ldots p_k-1$, is relatively prime to the public key portion e;*

*establishing a private key portion d by a relationship to the public key portion e in the form of $d \equiv e^{-1}(mod((p_1-1)\cdot(p_2-1) \ldots (p_k-1)))$;*

*computing a composite number, n, as a product of the k distinct random prime numbers;*

*receiving a ciphertext message data C representing an encoded form of a plaintext message data M; and*

*decoding the received ciphertext message data C to the plaintext message data M using a relationship of the form*

$$M \equiv C^d (mod\ n),$$

*the decoding performed by a recipient owning the private key portion d and having access to the k distinct random prime numbers $p_1, p_2, \ldots p_k$;*

*wherein p and q are a pair of prime numbers that product of which equals a composite number m, the k distinct random prime numbers each smaller than p and q, and the composite number m having the same number of digits as the composite number n;*

*wherein the decoding step is divided into sub-steps, one sub-step for each of the k distinct random prime numbers; and*

*wherein for a given number of digits for composite numbers n and m, it takes fewer computational cycles to perform the decoding step if the k distinct random prime numbers are used, relative to the number of computational cycles for performing a decoding step if the pair of prime numbers p and q is used instead.*

*20. The method according to claim 19, wherein the ciphertext message data C is formed by encoding the plaintext message data M to the ciphertext message data C using a relationship of the form $C \equiv M^e$ (mod n), wherein $0 \leqq M \leqq n-1$ and wherein n and the public key portion e are accessible to the sender although it has no access to the k distinct random prime numbers $p_1, p_2, \ldots p_k$.*

*21. The method according to claim 19, wherein a message cryptographically processed by the sender with two-prime RSA public key encryption characterized by the composite number m being computed as the product of the pair of prime numbers p and q, is decipherable by the decoding with multi-prime (k>2) RSA public key encryption characterized by the composite number n being computed as the product of the k distinct random prime numbers $p_1, p_2, \ldots p_k$.*

*22. The method according to claim 19, wherein n and m include values that are more than 600 digits long.*

*23. A method of communicating a message cryptographically processed with RSA public key signing, comprising the steps of:*

*selecting a public key portion e;*

*developing k distinct random prime numbers $p_1, p_2, \ldots p_k$, where $k \geqq 3$, and checking that each of the k distinct random prime numbers minus 1, $p_1-1, p_2-1, \ldots p_k-1$, is relatively prime to the public key portion e;*

*establishing a private key portion d of a relationship to the public key portion e of the form $d \equiv e^{-1}(mod((p_1-1)\cdot(p_2-1) \ldots (p_k-1))))$;*

*computing a composite number, n, as product of the k distinct random prime numbers;*

*encoding a plaintext message data M with the private key portion d to produce a signed message $M_S$ using a relationship of the form*

$$M_S \equiv M^d (mod\ n),$$

*where $0 \leqq M \leqq n-1$;*

*receiving the signed message $M_S$; and*

*deciphering the signed message to produce the plaintext message data M;*

*wherein p and q are a pair of prime numbers that product of which equals a composite number m, the k distinct*

*random prime numbers each smaller than p and q, and the composite number m having the same number of digits as the composite number n;*

*wherein the encoding step is divided into sub-steps, one sub-step for each of the k distinct random prime numbers; and*

*wherein for a given number of digits for composite numbers n and m, it takes fewer computational cycles to perform the encoding step if the k distinct random prime numbers are used, relative to the number of computational cycles for performing an encoding step if the pair of prime numbers p and q is used instead.*

*24. The method of claim 23, wherein the deciphering step includes:*

*decoding the signed message $M_S$ with the public key portion e to produce the plaintext message data M using a relationship of the form $M \equiv M_S^e (mod\ n)$.*

*25. The method according to claim 23, wherein the signed message $M_S$ formed from the plaintext message data M being cryptographically processed at the sender with multi-prime (k>2) RSA public key signing which is characterized by the composite number n being computed as the product of the k distinct random prime numbers $p_1, p_2, \ldots p_k$, is decipherable by the decoding at the recipient with two-prime RSA public key signing characterized by the composite number m being computed as the product of the pair of prime numbers p and q.*

*26. The method according to claim 23, wherein n and m include values that are more than 600 digits long.*

*27. A method for communicating a message cryptographically processed with RSA public key encryption, comprising the steps of:*

*sending to a recipient a cryptographically processed message formed by assigning a number M to represent the message in plaintext message form, and cryptographically transforming the assigned number M from the plaintext message form to a number C that represents the message in an encoded form, wherein the number C is a function of*

*the assigned number M,*

*a number n that is a composite number equaling the product of at least three distinct random prime numbers, wherein $0 \leqq M \leqq n-1$, and*

*an exponent e that is a number relatively prime to a lowest common multiplier of the at least three distinct random prime numbers,*

*wherein the number n and exponent e having been obtained by the sender are associated with the recipient to which the message is intended; and*

*receiving the cryptographically processed message which is decipherable by the recipient based on*

*the number n,*

*another exponent d, and*

*the number C,*

*wherein the exponent d is a function of the exponent e and the at least three distinct random prime numbers;*

*wherein p and q are a pair of prime numbers that product of which equals a composite number m, the at least three distinct random prime numbers each smaller than p and q, and the composite number m having the same number of digits as the composite number n;*

*wherein deciphering the cryptographically processed message is divided into sub-steps, one sub-step for each of the at least three distinct random prime numbers; and*

*wherein for a given number of digits for composite numbers n and m, it takes fewer computational cycles to perform the deciphering if the at least three distinct random prime numbers are used, relative to the number of computational cycles for performing a deciphering if the pair of prime numbers p and q is used instead.*

*28. The method according to claim 27,*

*wherein the cryptographically transforming step includes using a relationship of the form $C \equiv M^e (mod\ n)$,*

*wherein the exponent d is established based on the at least three distinct random prime numbers $p_1, p_2, \ldots p_k$, using a relationship of the form $d \equiv e^{-1}(mod((p_1-1)\cdot(p_2-1)\ldots(p_k-1)))$, and*

*wherein the cryptographically processed message is deciphered using a relationship of the form $M \equiv C^d (mod\ n)$.*

*29. The method according to claim 27, wherein a message cryptographically processed by the sender with two-prime RSA public key encryption characterized by the composite number m being computed as the product of the pair of prime numbers p and q, is decipherable at the recipient with multi-prime RSA public key encryption characterized by the composite number n being computed as the product of the at least three distinct random prime numbers.*

*30. The method according to claim 27, wherein n and m include values that are more than 600 digits long.*

*31. A method for communicating a message cryptographically processed with RSA public key encryption, comprising the steps of:*

*receiving from a sender a cryptographically processed message, in the form of a number C, which is decipherable by the recipient based on a number n, an exponent d, and the number C; and*

*deciphering the cryptographically processed message,*

*wherein a number M represents a plaintext form of the message,*

*wherein the number C represents a cryptographically encoded form of the message and is a function of the number M,*

*the number n that is a composite number equaling the product of at least three distinct random prime numbers, wherein $0 \leqq M \leqq n-1$, and*

*an exponent e that is a number relatively prime to a lowest common multiplier of the at least three distinct random prime numbers,*

*wherein the number n and exponent e are associated with the recipient to which the message is intended, and*

*wherein the exponent d is a function of the exponent e and the at least three distinct random prime numbers;*

*wherein p and q are a pair of prime numbers that product of which equals a composite number m, the at least three distinct random prime numbers each smaller than p and q, the composite number m having the same number of digits as the composite number n;*

*wherein deciphering the cryptographically processed message is divided into sub-steps, one sub-step for each of the at least three distinct random prime numbers; and*

*wherein for a given number of digits for composite numbers n and m, it takes fewer computational cycles to perform the deciphering if the at least three distinct random prime numbers are used, relative to the number of computational cycles for performing a deciphering if the pair of prime numbers p and q is used instead.*

*32. The method according to claim 31,*

*wherein the number C is formed using a relationship of the form $C \equiv M^e (mod\ n)$,*

*wherein the exponent d is established based on the at least three distinct random prime numbers $p_1, p_2, \ldots p_k$, using a relationship of the form $d \equiv e^{-1}((p_1-1)\cdot(p_2-1)\ldots(p_k-1)))$,*

*and wherein the number M is obtained using a relationship of the form $M \equiv C^d (mod\ n)$.*

*33. The method according to claim 31, wherein a message cryptographically processed by the sender with two-prime RSA public key encryption characterized by the composite number m being computed as the product of the pair of prime numbers p and q, is decipherable at the recipient with multi-prime RSA public key encryption characterized by the composite number n being computed as the product of the at least three distinct random prime numbers.*

*34. The method according to claim 31, wherein n and m include values that are more than 600 digits long.*

*35. A cryptography method for local storage of data by a private key owner, comprising the steps of:*

*selecting a public key portion e;*

*developing k distinct random prime numbers, $p_1, p_2, \ldots p_k$, where $k \geqq 3$, and checking that each of the k distinct random prime numbers minus 1, $p_1-1, p_2-1, \ldots, p_k-1$, is relatively prime to the public key portion e;*

*establishing a private key portion d by a relationship to the public key portion e in the form of $d \equiv e^{-1}(mod((p_1-1)\cdot(p_2-1)\ldots(p_k-1)))$;*

*computing a composite number, n, as a product of the k distinct random prime numbers that are factors of n, where only the private key owner knows the factors of n; and*

*encoding plaintext data M to ciphertext data C for the local storage, using a relationship of the form*

$$C \equiv M^e (mod\ n),$$

*wherein $0 \leqq M \leqq n-1$, whereby the ciphertext data C is decipherable only by the private key owner having available to it the factors of n;*

*wherein p and q are a pair of prime numbers that product of which equals a composite number m, the k distinct random prime numbers each smaller than p and q, and the composite number m having the same number of digits as the composite number n;*

*wherein the encoding step is divided into sub-steps, one sub-step for each of the k distinct random prime numbers; and*

*wherein for a given number of digits for composite numbers n and m, it takes fewer computational cycles to perform the encoding step if the k distinct random prime numbers are used, relative to the number of computational cycles for performing an encoding step if the pair of prime numbers p and q is used instead.*

*36. The cryptography method in accordance with claim 35, further comprising the steps of:*

*decoding the ciphertext data C from the local storage to the plaintext data M using a relationship of the form $M \equiv C^d (mod\ n)$.*

*37. A cryptographic communications system, comprising:*

*a plurality of stations;*

*a communications medium; and*

*a host system adapted to communicate with the plurality of stations via the communications medium sending and receiving messages cryptographically processed with an RSA public key encryption, the host system including at least one cryptosystem configured for*

*developing k distinct random prime numbers $p_1, p_2, \ldots, p_k$, where $k \geqq 3$,*

*checking that each of the k distinct random prime numbers minus 1, $p_1-1, p_2-1, \ldots p_k-1$, is relatively prime to a public key portion e that is associated with the host system,*

*computing a composite number, n, as a product of the k distinct random prime numbers,*

*establishing a private key portion d by a relationship of the public key portion e in the form of $d \equiv e^{-1}(mod((p_1-1)\cdot(p_2-1)\ldots(p_k-1)))$,*

*in response to an encoding request from the host system, encoding a plaintext message data M producing therefrom a ciphertext message data C to be communicated via the host system, the encoding using a relationship of the form*

$$C \equiv M^e (mod\ n),$$

*where $0 \leqq M \leqq n-1$, and*

*in response to a decoding request from the host system, decoding a ciphertext message data C' communicated via the host producing therefrom a plaintext message data M' using a relationship of the form*

$$M' \equiv C'^d (mod\ n);$$

*wherein p and q are a pair of prime numbers that product of which equals a composite number, the k distinct random prime numbers each smaller than p and q, and the composite number m having the same number of digits as the composite number n;*

*wherein decoding the ciphertext message data C' is divided into sub-steps, one sub-step for each of the k distinct random prime numbers; and*

*wherein for a given number of digits for composite numbers n and m, it takes fewer computational cycles to perform the decoding of the ciphertext message data C' if the k distinct random prime numbers are used, relative to the number of computational cycles for performing a decoding of the ciphertext message data C' if the pair of prime numbers p and q is used instead.*

*38. The system of claim 37, wherein the at least one cryptosystem includes a plurality of exponentiators configured to operate in parallel in developing respective subtask values corresponding to the message.*

*39. The system of claim 37, wherein the at least one cryptosystem includes*

*a processor,*

*a data-address bus,*

*a memory coupled to the processor via the data-address bus,*

*a data encryption standard (DES) unit coupled to the memory and the processor via the data-address bus, and*

*a plurality of exponentiator elements coupled to the processor via the DES unit, the plurality of exponentiator elements being configured to operate in parallel in developing respective subtask values corresponding to the message.*

*40. The system of claim 39, wherein the memory and each of the plurality of exponentiator elements has its own DES unit that cryptographically processes message data received/returned from/to the processor.*

*41. The system of claim 39, wherein the memory is partitioned into address spaces addressable by the processor, including secure, insecure and exponentiator elements address spaces, and wherein the DES unit is configured to recognize the secure and exponentiator elements address spaces and to automatically encode message data therefrom*

*before it is provided to the exponentiator elements, the DES unit being bypassed when the processor is accessing the insecure memory address spaces, the DES unit being further configured to decode encoded message data received from the memory before it is provided to the processor.*

*42. The system of claim 39, wherein the at least one cryptosystem meets FIPS (Federal Information Processing Standard) 140-1 level 3.*

*43. The system of claim 39, wherein the processor maintains in the memory the public key portion e and the composite number n with its factors $p_1, p_2, \ldots p_k$.*

*44. A system for communications of a message cryptographically processed with RSA public key encryption, comprising:*

*a bus; and*

*a cryptosystem communicatively coupled to and receiving from the bus encoding and decoding requests, the cryptosystem being configured for*

*providing a public key portion e,*

*developing k distinct random prime numbers $p_1, p_2, \ldots, p_k$, where $k \geqq 3$,*

*checking that each of the k distinct random prime numbers minus 1, $p_1-1, p_2-1, \ldots p_{k1}$, is relatively prime to the public key portion e,*

*computing a composite number, n, as a product of the k distinct random prime numbers,*

*establishing a private key portion d by a relationship to the public key portion e in the form of $d \equiv e^{-1}(\text{mod } ((p_1-1)\cdot(p_2-1) \ldots (p_k-1)))$,*

*in response to an encoding request from the bus, encoding a plaintext form of a first message M to produce C, a ciphertext form of the first message, using a relationship of the form*

$$C \equiv M^e (\text{mod } n),$$

*wherein $0 \leqq M \leqq n-1$, and*

*in response to a decoding request from the host system, decoding C', a ciphertext form of a second message, to produce M', a plaintext form of the second message, using a relationship of the form*

$$M' \equiv C'^d (\text{mod } n),$$

*the first and second messages being distinct or one and the same;*

*wherein p and q are a pair of prime numbers that product of which equals a composite number m, the k distinct random prime numbers each smaller than p and q, and the composite number m having the same number of digits as the composite number n;*

*wherein decoding C' is divided into sub-steps, one substep for each of the k distinct random prime numbers; and*

*wherein for a given number of digits for composite numbers n and m, it takes fewer computational cycles to perform the decoding of C' if the k distinct random prime numbers are used, relative to the number of computational cycles for performing a decoding of C' if the pair of prime numbers p and q is used instead.*

*45. A system for communications of a message cryptographically processed with RSA public key encryption, comprising:*

*a bus; and*

*a cryptoplasm receiving from the system via the bus encoding and decoding requests, the cryptosystem including*

*a plurality of exponentiator elements configured to develop subtask values,*

*a memory, and*

*a processor configured for*

*receiving the encoding and decoding requests, each encoding request providing a plaintext message M to be encoded,*

*obtaining a public key that includes an exponent e and a modulus n, a representation of the modulus n existing in the memory in the form of its k distinct random prime number factors $p_1, p_2, \ldots p_k$, where $k \geqq 3$,*

*constructing subtasks, one subtask for each of the k factors, to be executed by the exponentiator elements for producing respective ones of the subtask values $C_1, C_2, \ldots C_k$, and*

*forming a ciphertext message C from the subtask values $C_1, C_2, \ldots C_k$,*

*wherein the ciphertext message C is decipherable using a private key that includes the modulus n and an exponent d which is a function of e;*

*wherein p and q are a pair of prime numbers that product of which equals a modulus m, the k distinct random prime numbers each smaller than p and q, and the modulus m having the same number of digits as the modulus n; and*

*wherein for a given number of digits for modulus n and modulus m, it takes fewer computational cycles to form the ciphertext message C if the k distinct random prime numbers are used, relative to the number of computational cycles for forming a ciphertext message C' if the pair of prime numbers p and q is used instead.*

*46. The system of claim 45, wherein each one of the subtask values $C_1, C_2, \ldots C_k$ is developed using a relationship of the form $C_i \equiv M_i^{e_i} (\text{mod } p_i)$, where $M_i \equiv M(\text{mod } p_i)$, and $e_i \equiv e (\text{mod } p_i-1)$, and where $i=1, 2, \ldots k$.*

*47. A system for communications of a message cryptographically processed with RSA public key encryption, comprising:*

*a bus; and*

*a cryptosystem receiving from the system via the bus encoding and decoding requests, the cryptosystem including*

*a plurality of exponentiator elements configured to develop subtask values,*

*a memory, and*

*a processor configured for*

*receiving the encoding and decoding requests, each encoding/decoding request provided with a plaintext/ciphertext message M/C to be encoded/decoded and with or without a public/private key that includes an exponent e/d and a modulus n representation of which exists in the memory in the form of its k distinct random prime number $p_1, p_2, \ldots p_k$, where $k \geqq 3$,*

*obtaining the public/private key from the memory if the encoding/decoding request is provided without the public/private key,*

*constructing subtasks to be executed by the exponentiator elements for producing respective ones of the subtask values $M_1, M_2, \ldots M_k/C_1, C_2, \ldots C_k$, and*

*forming the ciphertext/plaintext message C/M from the subtask values $C_1, C_2, \ldots C_k/M_1, M_2, \ldots M_k$;*

*wherein p and q are a pair of prime numbers that product of which equals a modulus m, the k distinct random prime numbers each smaller than p and q, and the modulus m having the same number of digits as the modulus n; and*

*wherein for a given number of digits for modulus n and modulus m, it takes fewer computational cycles to*

*form the ciphertext/plaintext message C/M if the k distinct random prime numbers are used, relative to the number of computational cycles for forming a ciphertext/plaintext message C'/M' if the pair of prime numbers p and q is used instead.*

*48. The system of claim 47 wherein when produced each one of the subtasks $C_1, C_2, \ldots C_k$ is developed using a relationship of the form $C_i \equiv M_i^{e_i} \pmod{p_i}$, where $C_i \equiv C \pmod{p_i}$, and $e_i \equiv e \pmod{p_i - 1}$, and where $i=1, 2, \ldots, k$.*

*49. The system of claim 47 wherein when produced each one of the subtasks $M_1, M_2, \ldots M_k$ is developed using a relationship of the form $M_i \equiv C_i^{d_i} \pmod{p_i}$, where $M_i \equiv M \pmod{p_i}$, and $d_i = d \pmod{p_i - 1}$, and where $i=1, 2, \ldots, k$.*

*50. The system of claim 49, wherein the private key exponent d relates to the public key exponent e via $d \equiv e^{-1} \pmod{((p_1-1)\cdot(p_2-1)\ldots(p_k-1)))}$.*

*51. A system for communications of a message cryptographically processed with RSA public key encryption, comprising:*

*means for selecting a public key portion e;*

*means for developing k distinct random prime number $p_1, p_2, \ldots p_k$, where $k \geqq 3$, and for checking that each of the k distinct random prime numbers minus 1, $p_1-1, p_2-1, \ldots p_k-1$, is relatively prime to the public key portion e;*

*means for establishing a private key portion of d by a relationship to the public key portion e in the form of $d \equiv e^{-1} \pmod{((p_1-1)\cdot(p_2-1)\ldots(p_k-1)))}$;*

*means for computing a composite number, n, as a product of the k distinct random prime numbers;*

*means for receiving a ciphertext message data C; and*

*means for decoding the ciphertext message data C to a plaintext message data M using a relationship of the form*

$$M \equiv C^d \pmod{n};$$

*wherein p and q are a pair of prime numbers that product of which equals a composite number m, the k distinct random prime numbers each smaller than p and q, and the composite number m having the same number of digits as the composite number n;*

*wherein decoding said ciphertext message data C is divided into sub-steps, one sub-step for each of the k distinct random prime numbers; and*

*wherein for a given number of digits for composite numbers n and m, it takes fewer computational cycles to perform the decoding of said ciphertext message data C if the k distinct random prime numbers are used, relative to the number of computational cycles for performing a decoding of said ciphertext message data C if the pair of prime numbers p and q is used instead.*

*52. The system according to claim 51, further comprising:*

*means for encoding the plaintext message data M to the ciphertext message data C, using a relationship of the form $C \equiv M^e \pmod{n}$, where $0 \leqq M \leqq n-1$.*

*53. A system for communications of a message cryptographically processed with RSA public key signing, comprising:*

*means for selecting a public key portion e;*

*means for developing k distinct random prime numbers $p_1, p_2, \ldots p_k$, where $k \geqq 3$, and for checking that each of the k distinct random prime numbers minus 1, $p_1-1, p_2-1, \ldots p_k-1$, is relatively prime to the public key portion e;*

*means for establishing a private key portion d by a relationship to the public key portion e of the form $d \equiv e^{-1} \pmod{((p_1-1)\cdot(p_2-1)\ldots(p_k-1)))}$;*

*means for computing a composite number, n, as a product of the k distinct random prime numbers; and*

*means for encoding a plaintext message data M with the private key portion d to produce a signed message $M_S$, using a relationship of the form*

$$M_S \equiv M^d \pmod{n},$$

*where $0 \leqq M \leqq n-1$, the signed message $M_S$ being decipherable using the public key portion e;*

*wherein p and q are a pair of prime numbers that product of which equals a composite number m, the k distinct random prime numbers each smaller than p and q, and the composite number m having the same number of digits as the composite number n;*

*wherein encoding said plaintext message data M is divided into sub-steps, one sub-step for each of the k distinct random prime numbers; and*

*wherein for a given number of digits for composite numbers n and m, it takes fewer computational cycles to perform the encoding of said plaintext message data M if the k distinct random prime numbers are used, relative to the number of computational cycles for performing an encoding of said plaintext message data M if the pair of prime numbers p and q is used instead.*

*54. The system of claim 53 further comprising:*

*means for decoding the signed message $M_S$ with the public key portion e to produce the plaintext message data M using a relationship of the form $M \equiv M_S^e \pmod{n}$.*

*55. The system of claim 52, wherein the system can communicate the cryptographically processed message to another system that encodes/decodes data with RSA public key encryption using a modulus value equal to n independent of the k distinct prime numbers.*

*56. The system of claim 54, wherein the system can communicate the cryptographically processed message to another system that encodes/decodes data with RSA public key signing using a modulus value equal to n independent of the k distinct prime numbers.*

* * * * *